L. F. DELANEY.
RESILIENT WHEEL.
APPLICATION FILED JUNE 20, 1910.

976,989.

Patented Nov. 29, 1910.

WITNESSES:
Chas. H. Hughes.
A. W. Heape.

INVENTOR.
LAWRENCE F. DELANEY
BY Harry D. Vallou
ATTORNEY.

UNITED STATES PATENT OFFICE.

LAWRENCE F. DELANEY, OF WATERTOWN, NEW YORK.

RESILIENT WHEEL.

976,989.     Specification of Letters Patent.     Patented Nov. 29, 1910.

Application filed June 20, 1910. Serial No. 567,787.

*To all whom it may concern:*

Be it known that I, LAWRENCE F. DELANEY, a citizen of the United States, residing at Watertown, in the county of Jefferson and State of New York, have invented certain new and useful Improvements in Resilient Wheels, of which the following is a specification.

This invention relates to improvements in resilient wheels, designed for use in connection with automobiles and other vehicles.

The object of the invention is to provide a novel, simple, strong and serviceable wheel of the class, in which a series of springs are employed for supporting the weight of the vehicle, and also for rendering the wheel resilient, without the use of the common pneumatic tires.

A further object is to provide a wheel upon which solid tires of any suitable kind may be employed.

The invention consists of a wheel having a frame comprising two similar parts constructed and arranged in a manner to obviate the use of spokes, separate rims, and the usual felly.

The invention further consists of a floating hub or box, which is disposed concentrically within the frame, the frame and hub being operatively connected by a series of radially arranged springs, all inclosed within the frame.

The invention further consists of novel means for securing the wheel to the axle of the vehicle, and for excluding dust from the interior of the wheel. And the invention further consists of means for preventing the heating of the solid rubber or other tires.

Other features and parts of the invention will be understood from the detail description which follows, and by reference to the accompanying drawing, which forms a part of this specification, and in which—

Figure 1:
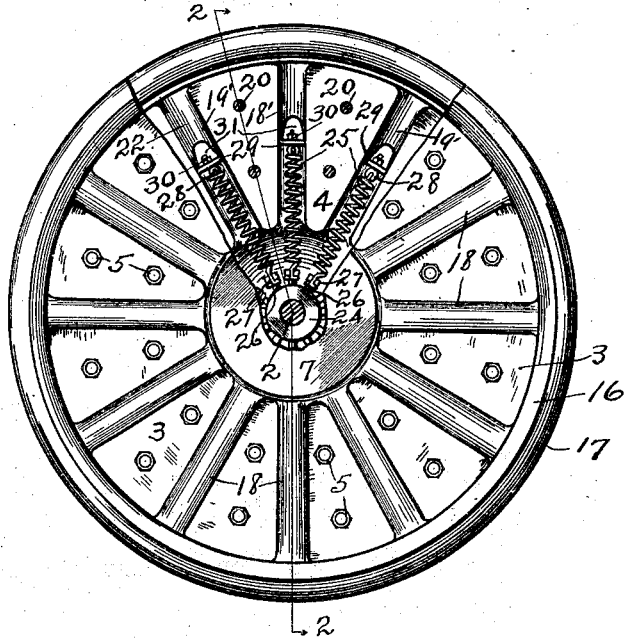
Figure 2:
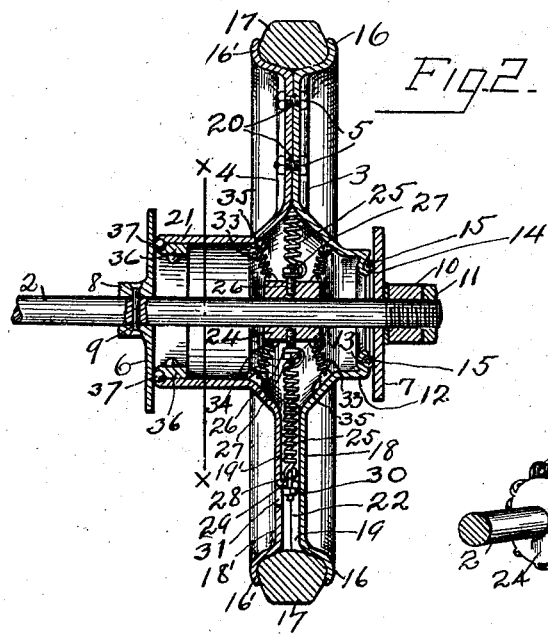
Figure 3:
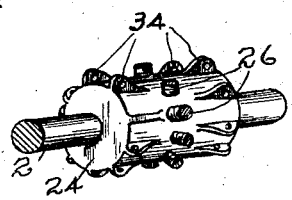

Figure 1 is a face-view of the wheel, with portions broken away, to show the interior construction and arrangement. Fig. 2 is a sectional view of the wheel taken on line 2—2 of Fig. 1. Fig. 3 is an enlarged perspective view of the box and a portion of the axle.

In the drawing, 2 represents the axle of a vehicle, which is preferably of the stationary type. The frame or main portion of my improved wheel consists of two concentric sections 3 and 4, representing respectively the front and rear sides of the wheel, and these sections are secured together, to form one part, by a series of bolts 5. The wheel, when mounted upon the axle of the vehicle, is disposed between two flange disks 6 and 7, both of which are perforated centrally for applying to the axle 2. The flange-disk 6 has a hub 8, which is perforated diametrically to receive a bolt or pin 9, by means of which the disk is rigidly secured to the axle. The disk 7 is mounted upon the axle 2 at the opposite or front side of the wheel, near the end of the axle, and is held in place by a pair of nuts 10 and 11, by means of which the wheel and the guard 7 are securely locked and held in operative position on the axle. Under this latter arrangement the disk 7 is free to turn on the axle.

The sections of the wheel, as 3 and 4, are preferably made of steel or like strong sheet metal, but they may also be made of malleable castings and serve their purposes equally well. In forming each of the sections 3 and 4 out of sheet metal, which is preferred, these parts are first formed-up by means of suitable dies, for the purpose of making the respective sections accurate and true, as well as, for cheapening the construction of the wheel. A more particular description of the metallic sections 3 and 4 follows: The central portion of section 3 of the frame is drawn or pressed, in a manner to form an integral tubular hub 12, which faces the flange 7. The free end of the hub is then upset and drawn into the opening, to provide an annular flange 13, which is formed with an annular groove or concavity 14, which faces the flange 7, and in which may be disposed a suitable packing 15, which bears directly against the inner face of flange 7. The packing 15 serves to present a removable and renewable bearing surface between flange 13 of the hub 12 and the disk or guard 7, and also serves to close the joint between the said parts, for preventing the entrance of dust or dirt. The opening in the hub 12 (or the flange 13) is considerably larger than the diameter of the axle 2, and is not intended to touch or bear upon the axle, the only bearing provided for section 3 of the frame being at the point where the packing 15 contacts with the guard 7. Section 3, at its peripheral edge, is formed into an integral clencher-rim or hook 16, which is annular, and is intended to receive and grip one side or edge of a solid rubber or other tire, as 17. Section 3 intermediate its hub 13 and its rim 16, comprises a web of sheet or other metal, which is provided at regular intervals with a series of concavo-convex ribs 18, which bulge outwardly on the face side of the wheel, and these ribs extend radially from the base of the hub 12 to the inner edge of the rim 16, for forming inwardly facing grooves or troughs 19, the opposite ends of which open respectively into the cavities formed by the hub 12 and the rim 16. The metal between the ribs 18 is perforated, as at 20, to receive the bolts 5 which secure the sections 3 and 4 together.

The section 4 of the frame preferably consists of a circular metallic part similar to section 3, and has a large central hub 21, which projects inwardly toward the flange 6. The outer peripheral edge of section 4 is formed into a like overhanging clencher-rim 16', which receives and grips the opposite side or edge of the tire 17. The portion of section 4, lying between the hub 21 and rim 16' is provided with a number of oppositely arranged concavo-convex ribs 18' for forming semi-tubular grooves 19' which are intended when the sections are bolted together, to coöperate with the grooves 19 for forming tubular spring sockets 22. The grooves 19' also open into the rim 16', as well as into the interior of the hub 21. Section 4 is provided between the ribs 18', with perforations 20, which coincide with the like perforation in section 3, for receiving the bolts 5. The arrangement of the section 4 is such that when mounted upon the axle no part of the said section touches or bears against the axle 2.

24 represents a cylindrical hub or floating-box which is bored out lengthwise to receive and turn upon the axle 2. The box 24 is disposed concentrically in the hollow center of the wheel-sections 3 and 4, and is connected with the frame of the wheel, by a series of cushion springs 25, one of which is disposed in each of the radial tubular sockets 22. The inner ends of the springs 25 are connected to the box 24 by means of a series of studs 26, and a nut 27. The studs 26 are arranged radially and equally spaced around the cylinder and may be attached thereto in any suitable manner, or they may be formed integrally with the box. The outer ends of the springs 25 extend part way in the length of the sockets 22, and are adjustably secured therein, by means of bolts 28, which pass through perforated lugs 29, and the adjustment of the springs is accomplished by nuts 30. The lugs 29 are preferably formed by perforating each rib 18' of section 4, and then forcing the metal inwardly across the groove 19'. Under this arrangement an opening 31 is provided in each of the ribs 18' for permitting access to the nuts 30, and also for admitting cold air to the sockets 22, from which the air may pass into the cavity of the rim beneath the tire 17, for preventing the tire from becoming overheated. 33, 33, represent a series of comparatively short and light coil-springs, which extend between the floating box 24 and parts 3 and 4 of the frame. The inner ends of these springs alternately connect with the front and rear end of the floating box 24, by means of a series of perforated lugs 34, which are formed on the hub, and which are preferably staggered as compared with the studs 26. The outer ends of the guy-springs 33 are alternately connected to the sections 3 and 4 by means of lugs 35. The guy-springs 33 perform several important functions: They coöperate with the cushion springs for holding the box concentric to the frame of the wheel; they bear a portion of the weight and load of the vehicle, and they also share, to a considerable extent, the strain, and absorb the shocks, incident to vibrations and jars of the vehicle when driven over rough roads. In this manner they lighten the work and prolong the life of the cushion springs, and at the same time contribute to the ease and comfort of the occupants of the vehicle. The cushion springs 25, owing to their greater length, and greater range of expansion and contraction, and owing also to their disposition and arrangement in the wheel, are relied upon to impart the greater part of the resiliency to the wheel. When these springs are properly made and adjusted, they will readily and safely bear the greater share of the weight of the vehicle and its load, and under normal conditions they will hold the frame of the wheel truly concentric to the axle 2 and the box 24. When the vehicle is in operation and traveling over a rough or uneven road-way, the floating box or hub 24 will always remain concentric to the axle 2, while the frame of the wheel will be subjected to more or less movement vertically relatively to the box and the flanges 6 and 7, which are also fixed concentrically upon the axle. Under this arrangement, owing to the flexible connections between the floating box and the frame of the wheel (sections 3 and 4), the free ends of hubs 12 and 21 will slide upon the inner faces of the flanges 6 and 7. The free end of hub 21 is preferably fitted with a ball-bearing attachment comprising a casing 36 and balls 37, which may be applied to the hub in any suitable manner, for allowing the balls only to have a bearing against the inner face of flange 6. By the provision of the ball-bearings for the hub 21, and the packing 15 for the hub 12, practically all friction between the said hubs and the flanges 6 and 7 is eliminated. If the pressure exerted by the nuts 10 and 11 against the flange 7 is strong enough the said flange may be rotated upon the axle by the frictional contact with the packing 15. The diameter of the hubs 12 and 21 and the arrangement of the parallel flanges 6 and 7 are such that the wheel will be held truly at right angles to the axle at all times.

The hub 21 is intended for use in connecting any suitable form of device for driving the rear wheels. The front wheels of automobiles or bicycles are rarely driven by the power, and the hubs 21 of these wheels may be made shorter than the rear wheels, as indicated by line x—x in Fig. 2. The hubs 21 of the rear wheels may also be employed in connection with the usual friction brake. As neither the driving mechanism nor the braking parts referred to form any part of the present invention, they have not been shown in the drawing.

In case the wheel drops into a ditch or strikes an abrupt obstruction in the roadway, if the jolt is heavy enough to overcome the cushion of the springs 25 and 33, the wheel may be suddenly shifted transversely to the axle a sufficient distance to cause the flange 13 or the inner surface of the hub 21 to strike the axle, but no damage will result, and only a slight jar will be felt. The springs will instantly restore the wheel to its normal relation,—substantially concentric to the axle and box.

Having thus described my invention, what I claim as new and desire to secure by Letters Patent, is—

1. A vehicle wheel, comprising front and rear concentric frame sections, joined together to form one part, oppositely facing tubular hubs formed on said sections and arranged concentric to each other, the bore of said hubs being of greater diameter than the axle of the vehicle, a floating bearing box mounted on the axle within and normally free from contact with said sections, a series of cushion springs for connecting the floating-box to one of said sections, the said springs disposed radially around said floating-box and inclosed between said sections, and a series of guy-springs connecting the opposite ends of said floating-box with the corresponding sections of the frame, said guy-springs and said cushion springs adapted to coöperate for holding the said frame normally concentric to the floating bearing box and the axle.

2. The combination with the axle of a vehicle, and a resilient wheel, comprising a frame arranged in two concentric sections having oppositely facing hollow hubs, of a pair of circular flange-guards mounted on the axle, at opposite sides of said frame and concentric to said hubs, said guards having a greater diameter than said hubs and adapted to hold said frame at right angles to the axle, an anti-friction means interposed between the free ends of each hub and the adjacent guard, a bearing-box journaled on the axle between said guards, and resilient means comprising a series of radially arranged cushion springs and a series of guy-springs for connecting said frame to said bearing-box.

3. A resilient wheel, comprising front and rear frame sections held together by a series of bolts, the peripheral edge of each section formed into an annular hook-rim adapted to grip and hold a solid tire when the sections are bolted together, each section having a like number of coinciding radial concavo-convex ribs for forming tubular spring sockets, the said sockets opening into the cavity of the rims for admitting air to cool the tire, the central portion of each section provided with a tubular hub arranged to face away from the adjacent section, the interior of the said hubs connecting with each of said spring sockets, a vehicle axle, a cylindrical bearing box journaled on said axle, the said box disposed opposite the inner ends of said spring sockets, the opposite ends of said box spaced inwardly from the free ends of said hubs, the said box being normally free from contact with either of said sections, a series of cushion springs disposed in said tubular sockets, the inner ends of said springs connected to the said box, the outer ends of said springs connected to lugs disposed in the said sockets between the said hubs and the said rims, and means connected with the outer ends of said springs for increasing or decreasing the tension of the springs.

4. The combination with a wheel, comprising two circular sections of equal diameter detachably joined as one part, and an independent bearing box disposed concentrically in said frame and spaced from the frame, the abutting faces of said sections provided with coinciding grooves for forming a series of radial tubular spring sockets, the portions of said sections lying between said sockets having coinciding perforations to receive bolts for securing said sections together, an integral lug disposed in each of said sockets, said lugs formed by perforating the side of one section in the line of and between the ends of said grooves, the said perforations adapted to admit cold air into said sockets for cooling the rim and tire of the wheel, a series of cushion springs connecting the floating-box with the lugs in said sockets, said springs adapted for normally holding said frame concentric to said floating-box, and for rendering the wheel resilient, and a pair of flange-disks carried by the axle of the vehicle adapted for holding said frame at right angles to the axle and for providing frictional bearings for the corresponding sections of the frame.

5. In a resilient vehicle wheel, the combination with a frame comprising two like concentric sections, arranged at their peripheral edges for gripping and holding a solid tire, the central portions of said sections being hollow and arranged with oppositely facing hubs, of a box journaled on the axle of the vehicle and disposed in the hollow center of the frame, said box being of less diameter than said hollow center and normally spaced from the frame and also from the ends of said hubs, a series of spring sockets arranged between said sections, the inner ends of said sockets facing the said box, a series of springs extending part way into said sockets for connecting said frame to said box, a series of springs disposed in the hollow center of the frame and connecting the opposite ends of said box to the corresponding hubs of the frame, and a pair of flange-guards carried by the axle for holding the wheel in place.

6. In a resilient wheel, the combination with the axle of a vehicle and a pair of spaced flange-guards carried by said axle, of a wheel frame comprising two concentric sections of equal diameter operatively disposed between said guards, each of said sections having a tubular center terminating in an outwardly projecting hub adapted to frictionally engage the adjacent flange-guard, an independent bearing-box journaled on the axle between said guards, a series of radial tubular sockets arranged between said sections and opening into the hollow center of said frame, a coil-spring disposed in each socket for connecting said bearing-box with said frame, means for adjusting the tension of said springs for normally holding said frame concentric to the axle and said box, and a series of guy-springs for connecting the opposite ends of said bearing-box to the corresponding sections of the frame.

In testimony whereof I affix my signature in presence of two witnesses.

LAWRENCE F. DELANEY.

Witnesses:
 WM. J. COYLE,
 C. L. DELANEY.